(12) United States Patent
Burkhart et al.

(10) Patent No.: US 9,302,339 B2
(45) Date of Patent: Apr. 5, 2016

(54) HYBRID WELDER WITH DETACHABLE ENERGY STORAGE DEVICE

(71) Applicant: Lincoln Global, Inc., City of Industry, CA (US)

(72) Inventors: Bryan Scott Burkhart, Chardon, OH (US); Adam Hruska, Chardon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 14/032,703

(22) Filed: Sep. 20, 2013

(65) Prior Publication Data
US 2015/0083700 A1    Mar. 26, 2015

(51) Int. Cl.
*B23K 9/10*    (2006.01)

(52) U.S. Cl.
CPC ............. *B23K 9/1081* (2013.01); *B23K 9/1006* (2013.01)

(58) Field of Classification Search
CPC ................................ B23K 9/1081; B23K 9/32
USPC .................... 219/130.1, 133, 134, 136, 130.4
See application file for complete search history.

(56) References Cited

U.S. PATENT DOCUMENTS

| | | | |
|---|---|---|---|
| 6,225,596 B1 | 5/2001 | Chandler | |
| 6,501,197 B1 | 12/2002 | Cornog et al. | |
| 7,183,517 B2 | 2/2007 | Albrecht et al. | |
| 7,259,355 B2 * | 8/2007 | Bender et al. | 219/133 |
| 7,777,447 B2 | 8/2010 | Vogel | |
| 7,838,797 B2 | 11/2010 | Albrecht | |
| 8,080,761 B2 * | 12/2011 | Matthews et al. | 219/130.1 |
| 8,304,682 B2 | 11/2012 | Fisk | |
| 2009/0057285 A1 | 3/2009 | Bashore et al. | |
| 2010/0187210 A1 * | 7/2010 | Albrecht | 219/133 |
| 2011/0114608 A1 * | 5/2011 | Albrecht | 219/112 |

FOREIGN PATENT DOCUMENTS

| | | | | |
|---|---|---|---|---|
| EP | 1852206 | 7/2007 | | |
| JP | 5318117 | 5/1992 | | |
| JP | 05318117 A | * 12/1993 | ............... | B23K 9/10 |

* cited by examiner

*Primary Examiner* — Tu B Hoang
*Assistant Examiner* — Alba Rosario-Aponte
(74) *Attorney, Agent, or Firm* — Calfee, Halter & Griswold LLP

(57) ABSTRACT

A hybrid welder having a cabinet, an energy storage device supported by the cabinet and means for removably attaching the cabinet to the welder.

10 Claims, 6 Drawing Sheets

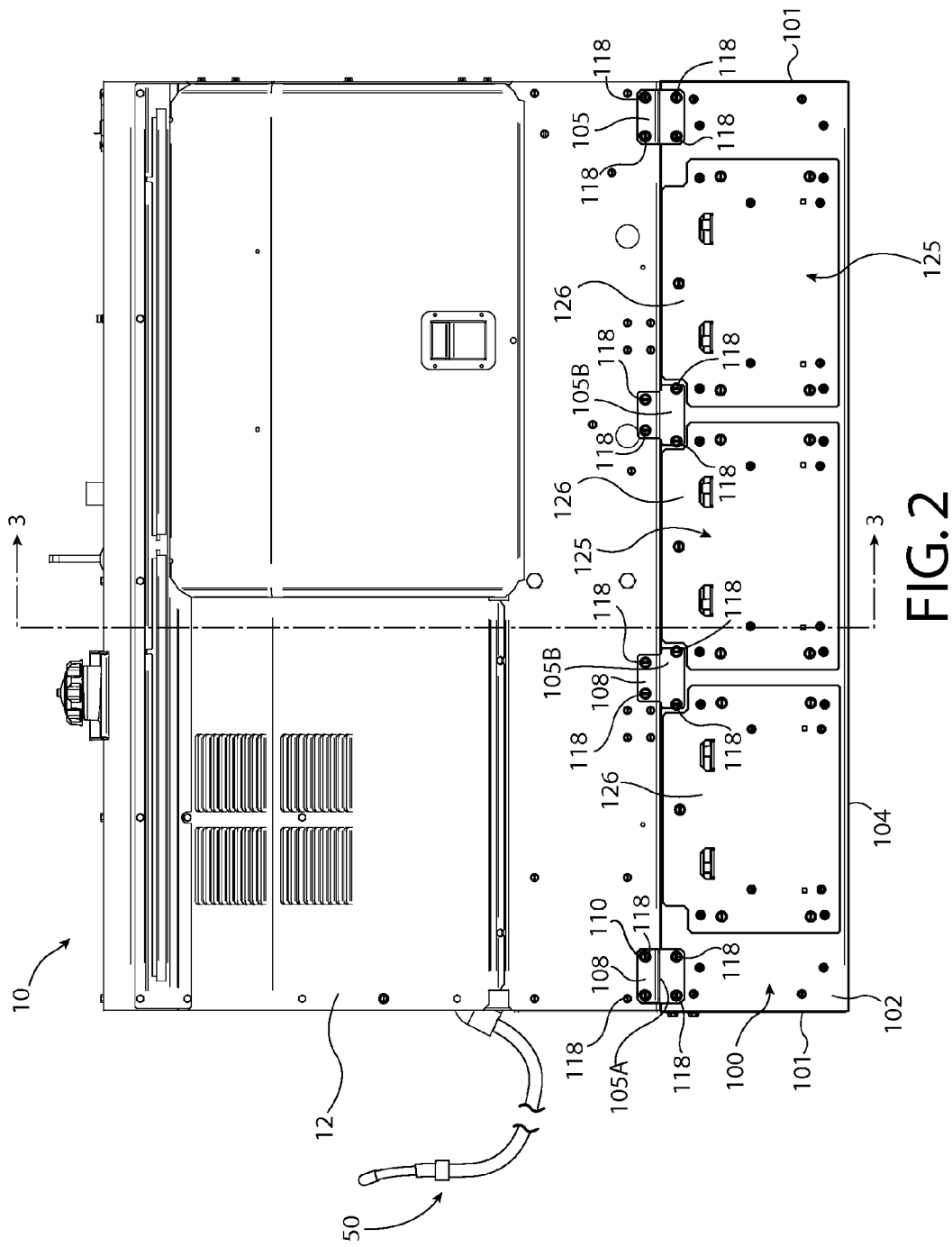

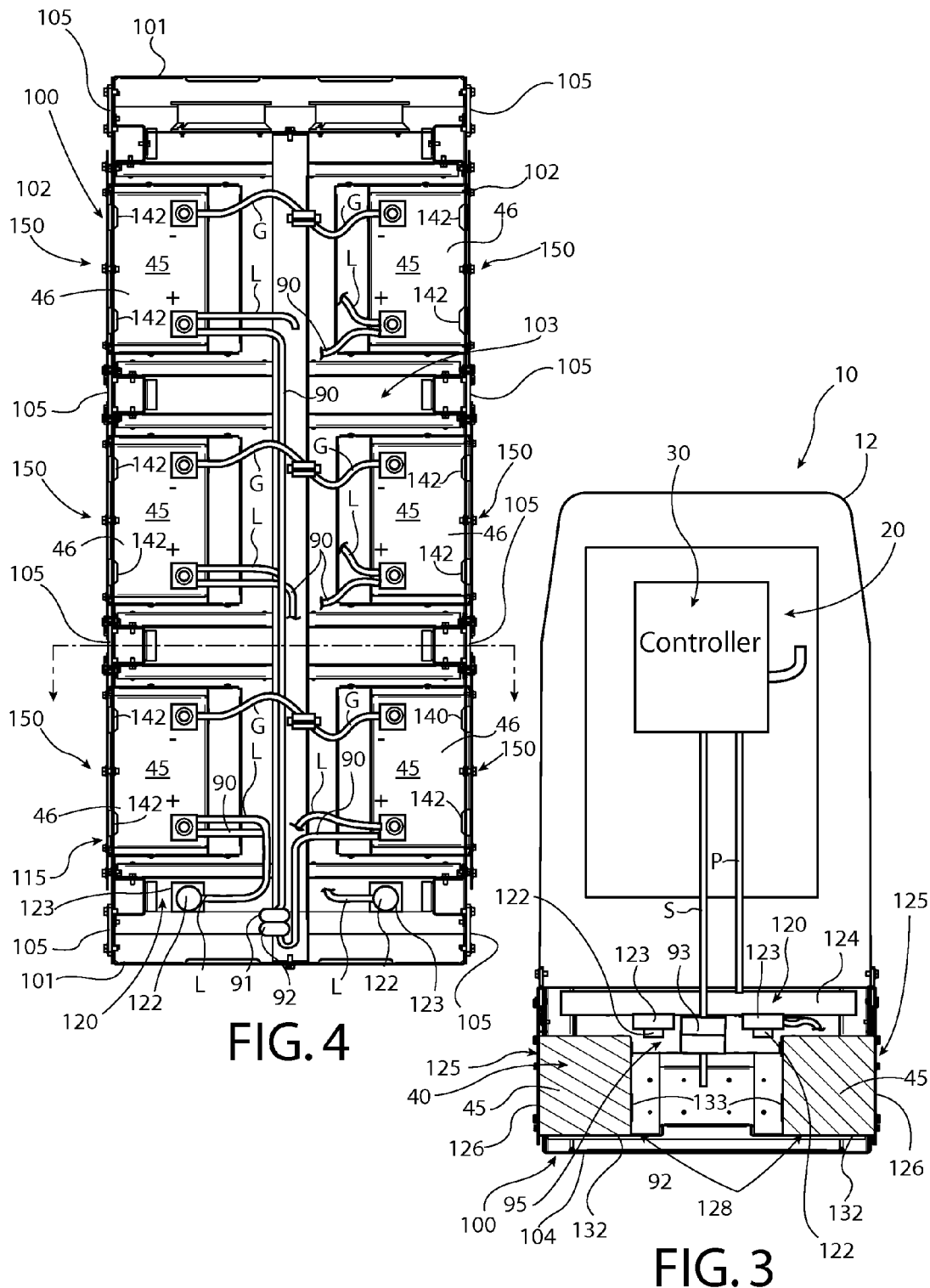

HYBRID WELDER WITH DETACHABLE ENERGY STORAGE DEVICE

TECHNICAL FIELD

The present invention generally relates to welding system and more particularly to a hybrid welding system having an engine and an energy storage device. Most particularly, the present invention relates to a hybrid welder having a detachable energy storage device.

BRIEF DESCRIPTION OF THE DRAWINGS

The following description and the annexed drawings set forth detail certain illustrated aspects of the claimed subject matter. These aspects are indicative, however, but of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

FIG. 2 is a side elevational view thereof.

FIG. 3 is a sectional view as might be seen along lines 3-3 in FIG. 2.

FIG. 4 is a top plan view of an energy storage device compartment according to the invention.

DETAILED DESCRIPTION OF THE INVENTION

The present invention is directed to a welding system that incorporates a detachable or removable energy storage device container or housing compartment to facilitate repair or replacement of the energy storage device or individual compartments thereof. It will be appreciated that other circumstances may require access to the energy storage device to facilitate maintenance or repairs on the welding system itself. The described and depicted examples are, therefore, not limiting.

Also, use of the terms welding system or welder includes any system that requires high power output including but not limited to heating, cutting, welding, and auxiliary power generation or power backup systems. For example, the present invention is applicable to arc or laser welders, plasma cutters, arc gougers, induction heaters, generators, and the like. The particular example shown in the following embodiments is an engine driven welder provided in a hybrid configuration where power from energy storage device supplements the power generated by the engine. Alternatively, the hybrid welder may operate on energy storage device or engine power alone depending on the application for which it is used. It will be understood that other welders may use power from energy storage device for other purposes and may not necessarily be used in a hybrid arrangement as shown. The example provided, therefore, should not be considered limiting.

As used herein, spatially orienting terms such as "above," "below," "upper," "lower," "inner," "outer," "right," "left," "vertical," "horizontal," "top," "bottom," "upward," "downward," "laterally," "upstanding," et cetera, can refer to respective positions of aspects as shown in or according to the orientation of the accompanying drawings. "Inward" is intended to be a direction generally toward the center of an object from a point remote to the object, and "outward" is intended to be a direction generally away from an internal point in the object toward a point remote to the object. Such terms are employed for purposes of clarity in describing the drawings, and should not be construed as exclusive, exhaustive, or otherwise limiting with regard to position, orientation, perspective, configuration, and so forth.

Figure 1:
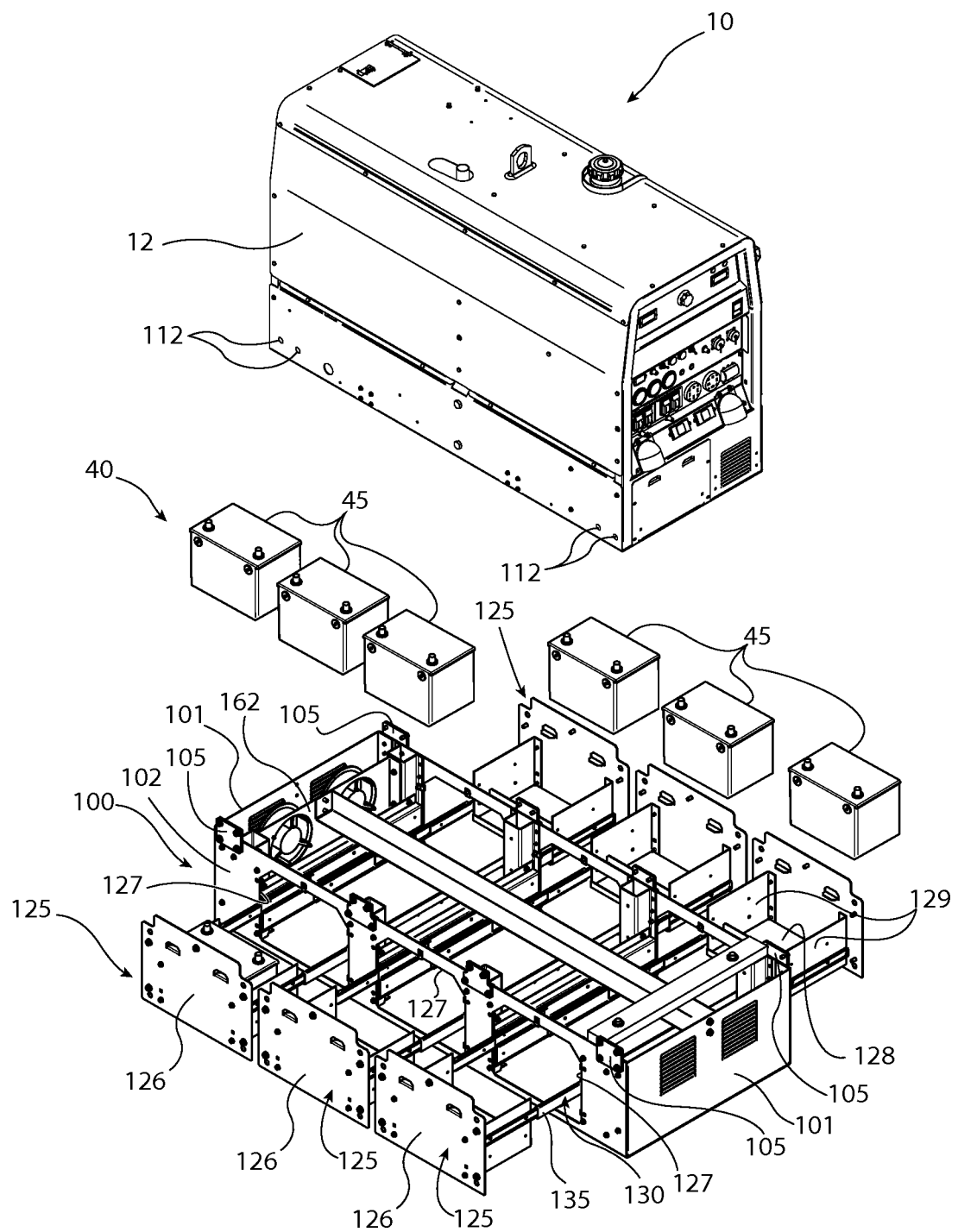
FIG. 1 is an exploded perspective view of a hybrid welder according to the invention.
Figure 5:
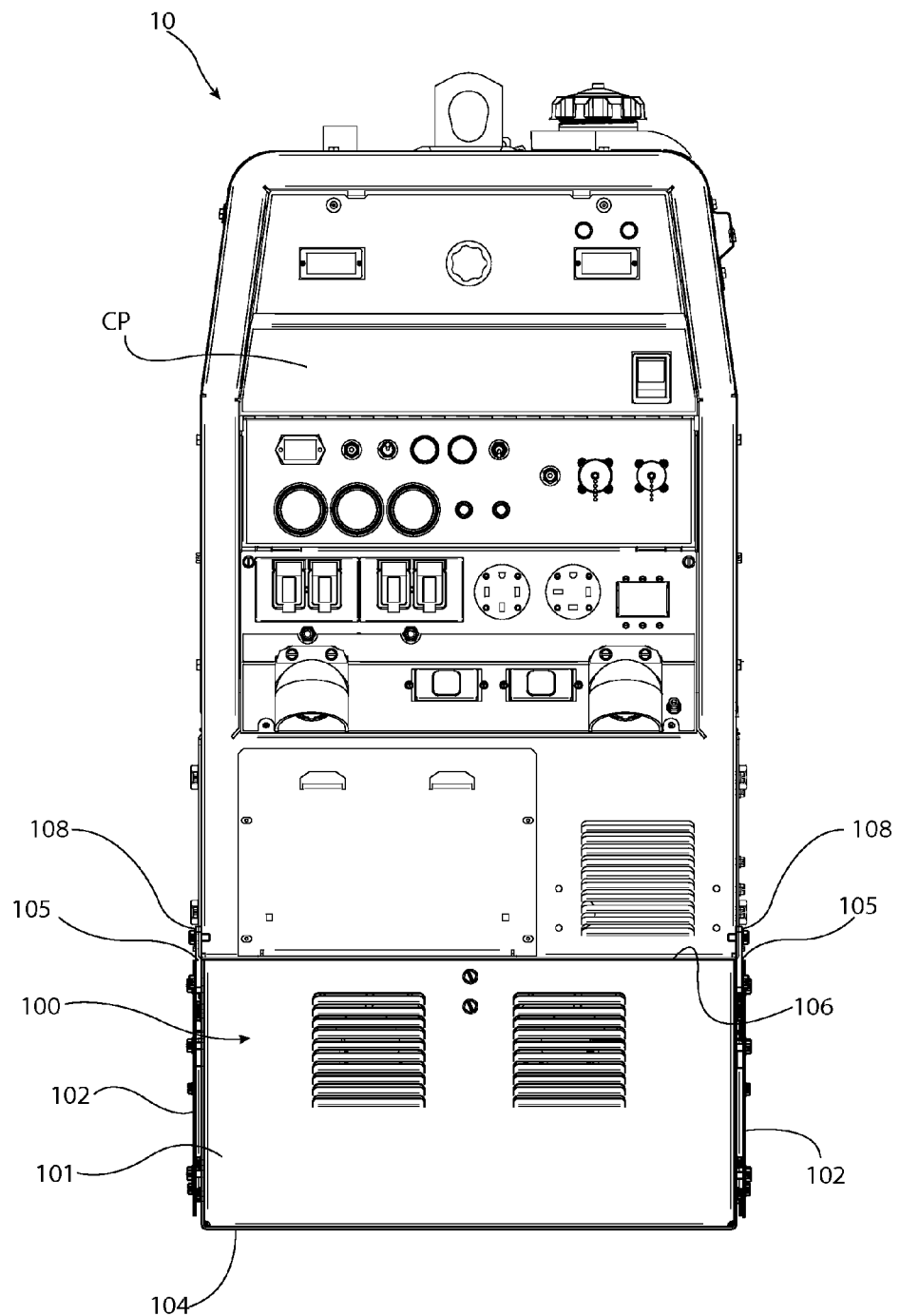
FIG. 5 is a front elevational view of the welding system.

With reference to FIG. 1, a welding system, generally indicated by the number 10 is shown. Welding system 10 includes a housing 12 which may enclose internal components of the welding system 10. In the example shown, housing 12 encloses an internal combustion engine, generally indicated by the number 20 and schematically shown in FIG. 3. Housing 12 may also enclose a controller, generally indicated by the number 30. A control panel CP or other user interface may be connected to controller 30 to facilitate operation of welder 10 and provide information to the user. Control panel CP may also provide outlets and connectors for a torch 50 and other accessories used with welder 10.

Engine 20 may form one power source for welding system 10 and may be used in conjunction with or as an alternative to a second power source including but not limited to an energy storage device, generally indicated by the number 40. Any energy storage device may be used including a battery, a capacitor storage device, a kinetic storage device and the like. In the example shown, energy storage device 40 includes one or more batteries 45. While six batteries 45 are shown in the depicted embodiment, this number is not limiting. More or fewer batteries may be used depending on the power output of the battery(ies) and the power needs of the welding system 10. Likewise, the type of battery material may be any type suitable for the output needs of the system and suitable for the working environment or application for the welder 10. In the example shown, a lead acid battery is used. Other suitable battery types includes but are not limited to NiCd, molten salt, NiZn, NiMH, Li-ion, gel, dry cell, absorbed glass mat, and the like.

With continued reference to FIG. 3, engine 20 may drive a generator (not shown) to produce power delivered to a detection circuit/power conditioner within controller 30. Likewise, energy storage device 40 may be in electrical communication with the controller 30 to supplement the power provided from the engine 20 or act as an alternative power source, as needed. Controller 30 may also in sensing communication with energy storage device 40 to monitor the output and/or performance of energy storage device 40. As shown in the depicted example, controller 30 may connected with one or more of the batteries 45 within energy storage device 40 by a sense lead to monitor the performance of the battery(ies). For example, sense leads may provide a voltage output from a battery 45 to controller 30. Other sensors and connections may be used to monitor the performance of one or more batteries 45. A visual, audible, or tactile cue may be provided to alert the user as to the performance of the battery 45 or whether the battery 45 requires repair or replacement. For example, a warning light, tone generator, or buzzer may provide a simple alert. More detailed information may be provided with a display, voice alert, or output. In the example shown, a display including a digital readout provides information about the performance of each of the batteries 45. The performance information provided may include but is not limited to the charge status of the battery, the number of volts stored, and the like.

Controller 30 may also provide suitable switching to prevent discharge from the energy storage device 40 when the welder 10 is not in use. For example, when welder 10 is not in use, controller 30 may open a switch between the energy storage device 40 and itself to prevent such discharge. When an operator activates the welder 10, the switch may be closed to provide power from the energy storage device 40 to the controller 30 for use in the welding or other power generation process. For example, for a welding system, as shown, power may be provided from one or both of the engine 20 and energy storage device 40 to power a torch, generally indicated by the number 50 to perform welding, cutting, or heating by the operator.

Controller 30 may also route power from engine 20 to energy storage device 40 to recharge energy storage device 40 as needed. It will be understood that controller 30 may operate engine 20 when the welding system is not being used for a welding operation to perform a recharging function. This may result in the engine 20 operating when the welding process is not being performed.

In accordance with an aspect of the invention, a cabinet 100 is provided to house energy storage device 40, and is detachable from the welding system housing 12. Cabinet 100 may have any size or shape suitable to support energy storage device 40. Cabinet 100 may be of skeletal construction with the energy storage device mounted thereon, or a cabinet 100 may have an exo-skeletal construction that encompasses all or a portion of energy storage device 40. For example, with reference to FIGS. 1 and 4, cabinet 100 may have rectangular box-like shape having a pair of end wall 101 joined by opposing side walls 102 extending upward from a floor 104 cabinet 100 defines a compartment 103 house energy storage device 40 within its confines.

To allow cabinet 100 to be detached or released from housing 12, a releasable attachment assembly is provided to selectively connect cabinet 100 to housing 12. Any form of releasable attachment assembly may be used including fasteners, clips, bayonet connections, latches, straps, bands, and the like. In the example shown in FIGS. 1 and 2, releasable attachment assembly includes tabs 105 provided to fasten cabinet 100 to housing. Tabs 105 may be carried on any portion of cabinet 100 and attached to housing 12 by a suitable fastener including but not limited to a clip, pin, snap fastener, rivet, or threaded fastener, as shown. In the example shown, tabs 105 extend from an upper portion of cabinet 100. Tabs 105 extend vertically above a horizontal plane defined by the top edge 106 of cabinet 100 allowing an upper portion 108 of each tab 105 to overlap a portion of housing 12. Fasteners extend through receivers 110 in upper portion 108 and into housing receivers 112 within housing to attach cabinet 100 to housing. Plural tabs may be used including, for example, tabs near the outer extremities of the perimeter 115 of cabinet. Cabinet 100 may have any shape, as discussed above, and the shape of the perimeter may change accordingly. Therefore, the example shown, which has a rectangular perimeter 115 with tabs 105 located near the corner of the perimeter 115 should not be considered limiting. Tabs 105 may be located inward of the extremities or additional tabs 105 may be provided. As shown in FIG. 1, tabs 105 may be located on opposite sides of the cabinet 100 and spaced evenly from each other. As best shown in FIGS. 1 and 2, four tabs are provided on each side resulting in four tabs 105 being located at the corners (corner tabs 105A) with two additional inboard tabs 105B located between the tabs at the corners on each side. Tabs 105 may be formed integrally with cabinet 100 or attached to cabinet 100 in any known manner including a weld or a fastener.

Removable fasteners 118 are provided to releasably attach cabinet 100 to housing. To detach cabinet 100, the fasteners 118 extending into the housing may be removed. In this way, the energy storage device 40, which may include multiple batteries, as shown, may be physically detached from welder 10 as a unit. It will be understood that releasable attachment may also be achieved by leaving tabs 105 attached to housing 12 and removing fasteners 118 attaching tabs 105 to cabinet 100.

While a threaded fastener 118 is used in the example shown, releasable fastener 118 may include but is not limited to clips, pins, snap-fasteners, latches, or hangers that attach cabinet 100 to housing 12.

In accordance with another aspect of the invention, the electrical connection between energy storage device 40 and controller 30 may be disconnected upon detachment of the cabinet 100. To facilitate this, a single electrical connection may be provided between the energy storage device 40 and controller 30 even when multiple energy storage devices or components thereof are used. To electrically disconnect energy storage device 40 when detaching cabinet 100 from welder 10, a power connector 120 may be provided. Power connector 120 generally provides an electrical connection between controller 30 and energy storage device 40. Connector 120 also allows the connection to be broken when cabinet 100 is detached. In the example shown, connector 120 may include one or more posts 122 to which power lead(s) from energy storage device 40 are connected. As best seen in FIGS. 3 and 4, for example, connector 120 may include a pair of battery posts 122 that extend downward from a bus bar 124. Bus bar 124 may be any conductor that provides an electrical connection between energy storage device 40 and controller 30 or torch 50, when controller 30 is not interposed therebetween. In the example shown, bus bar 124 consolidates electrical connections between multiple groups of batteries 45 by providing a post 122 for each group or bank of batteries 45 to be connected to controller 30. The posts 122 are electrically connected at bar 124 and a power cable P from controller 30 attaches to bar 124. In the example shown, each post 122 extending downward from bar 124 corresponds to one bank of batteries 45 within cabinet 100. In the depicted example, a first bank of batteries 45 is contained on one side of the cabinet 100 and a second bank of batteries 45 is contained on a second side of cabinet 100. The power leads from each battery 45 in each bank is wired in series so that a single power lead extends from the bank and is connected to a corresponding battery post 122 on one side of cabinet 100. While the example shown, divides batteries 45 into two groups, the batteries 45 may all be connected in series and power routed through a single post 122 or further division of the batteries may be made and additional posts 122 added as needed.

Post 122 may be any suitable point for connecting the power lead L from energy storage device 40, and may have any shape or configuration that allows the power lead to be selectively connected and disconnected. Therefore, the battery post configuration shown should not be considered limiting. In the example shown, lead L may be provided with connector 123 that clamps onto post 122. For example, connector 123 may define an opening that fits over post 122 and include a fastener or other device that provides a clamping force that draws the sides of the connector 123 together to form a compressive connection between the connector 123 and post 122. Connector 123 may attach to post 122 in other ways including but not limited to threaded attachment or sliding over post and being held by a stop, such as a pin, catch, clip, or nut that attaches to post 122. Therefore, the depicted example is not limiting. When cabinet 100 is detached, the electrical connection between energy storage device 40 and controller 30 may be disconnected by removing connector 123 from post 122.

As shown, post 122 may extend downward from a bus bar 124 that is electrically connected to controller 30. Bus bar 124 may be attached to the underside of housing 12 such that it remains once the cabinet 100 is detached and connectors 123 removed from posts 122. Alternatively, bus bar 124 may be attached to cabinet 100 and the connection between bar 124 and controller 30 may be broken when detaching the cabinet 100. To that end, a similar connection between bar 124 and controller 30 may be used and selectively disconnected when detaching cabinet 100.

Likewise, any sensing connection S between energy storage device 40 and controller 30 may also be disconnected upon releasing cabinet 100 from housing 12. For example, a modular connection may be provided between sense leads from each battery 45 and controller 30. Modular connector 95 may include any body that provides an electrical connection between one or more sense leads 90 that may be selectively disconnected including but not limited to a male and female plug arrangement as shown. In the depicted example, individual sense leads 90 extend from the positive terminal of each battery 45. As discussed, the batteries 45 on either side of cabinet 100 form two battery groups or banks. The sense leads 90 from each bank of batteries 45 may be grouped on a single connector or multiple connectors may be used for each bank. In the example shown, the three sense leads 90 from a first bank of batteries 45 are fed into a first plug 91 and the sense leads 90 from a second bank of batteries 45 are fed into a second plug 92. These plugs 91 and 92 are received by a receiver portion 93 of connector 95 to join the sense leads to controller 30. It will be appreciated that sense cable S may include individual leads corresponding to each sense lead 91. In the example shown, receiver 93 is a female component adapted to receive first plug 91 and second plug 92 therein. Receiver 93 includes six electrical connections corresponding to the six sense leads 90 extending from batteries 45. It will be appreciated that additional electrical connections may be provided for additional sensors or other electrical connections within cabinet 100 including but not limited to a temperature sensor, fan controller lead, and the like.

In accordance with another embodiment, access to individual energy storage devices or portions thereof may be provided as part of cabinet 100. For example, as shown, multiple batteries 45 may be housed within cabinet 100. To facilitate access to one or more battery 45 separately from other batteries 45, access panels may be provided on the sides of the cabinet 100 that expose one or more battery within cabinet 100. Alternatively, as shown, each battery 45 may be provided in a drawer 125. The term drawer should not be considered limiting in terms of configuration and includes any structure that allows the user to selectively access one or more battery 45 or other energy storage device 40. Each drawer may include a faceplate 126 that at least partially covers or fits into a drawer opening 127 defined in cabinet 100. As shown each drawer 125 may have its own opening may be formed in cabinet 125. Likewise, rather than providing an individual drawer for each battery 45, it is contemplated that plural batteries 45 or other energy storage devices may be placed in a single drawer. In the example shown a single drawer 125 might be used on opposing sides of the cabinet 100 to house three batteries 45.

Figure 6:
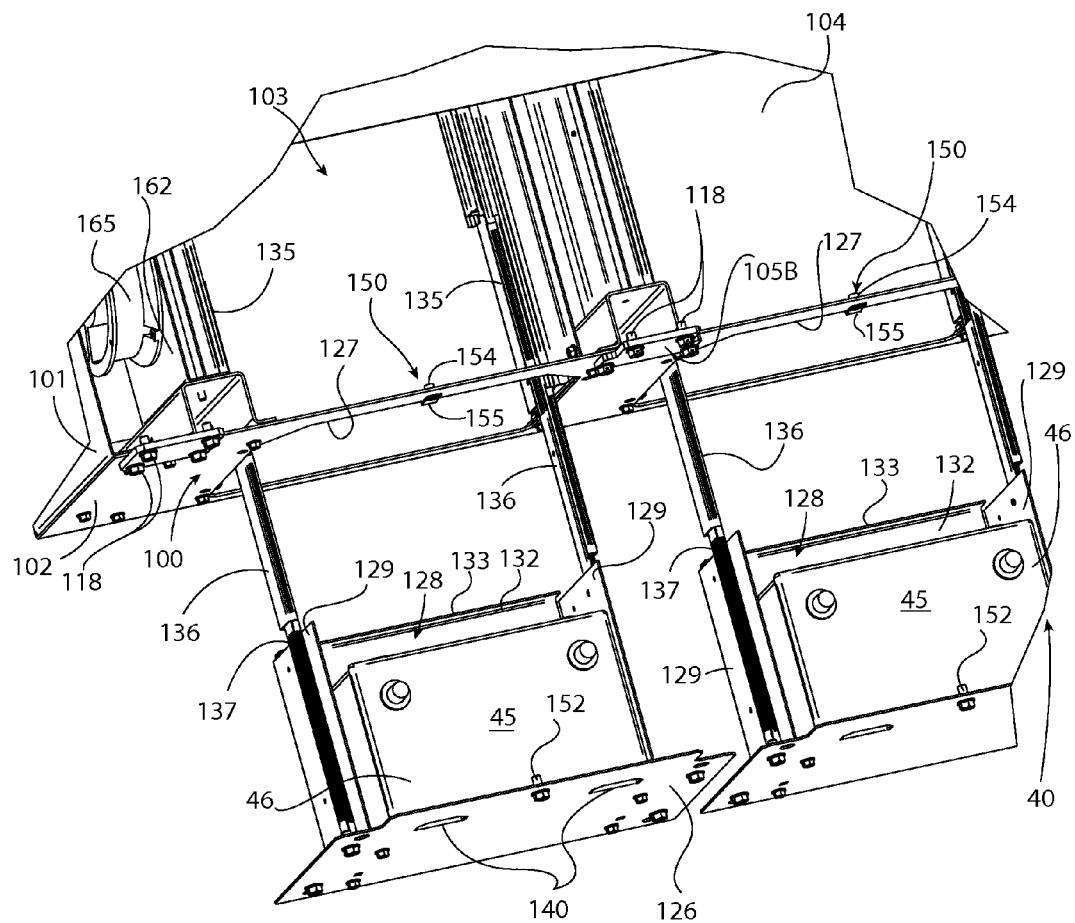
FIG. 6 is an enlarged perspective view of the energy storage device compartment depicted in FIG. 4 showing details of a drawer assembly in an open position.

As best seen in FIG. 6, drawer 125 may include a drawer frame 128 on which the battery 45 sits or is otherwise mounted to so that battery 45 moves with drawer 125. Drawer frame 128 may have any construction or configuration capable of supporting one or more energy storage device. In the example shown, drawer frame 128 includes a base panel 132 on which a battery 45 sits. Optionally drawer frame 128 may include side panels 129 that extend up from the base panel to form a U-shaped frame 128. The faceplate 126 may be attached to drawer frame 128, for example at tabs 131 extending inward from side panels 129. Optionally, a rear panel 133 may extend upward from base panel 132 inward of faceplate 127. In the example shown faceplate 126, side panels 129 and rear panel 133 define a box-like space in which the battery 45 is received. The drawer frame 128 may be at least partially extendable beyond the perimeter 105 of cabinet 100 to facilitate access to the energy storage device 40 or battery 45 as described more completely below. To that end, drawer frame may be made moveable in any direction to allow access to energy storage device including but not limited to extending rotating, or tilting outward from cabinet 100. For example, as shown, drawer 125 may slide outward from cabinet 100. This may be achieved by simply slidably mounting drawer 125 in drawer opening 127.

The operator may access an individual battery 45 by pulling the drawer 125 out from the side of the cabinet 100. Alternatively, as shown, drawer 125 may be mounted on a slider assembly 130. Slider assembly 130 may include support rails 135 that extend inward from opening 127 and include an extendable rail 136 that is attached to the drawer 125 by a drawer rail 137 that telescopes outward from rails 135 when the drawer is pulled outward as shown in FIG. 6.

Figure 7:
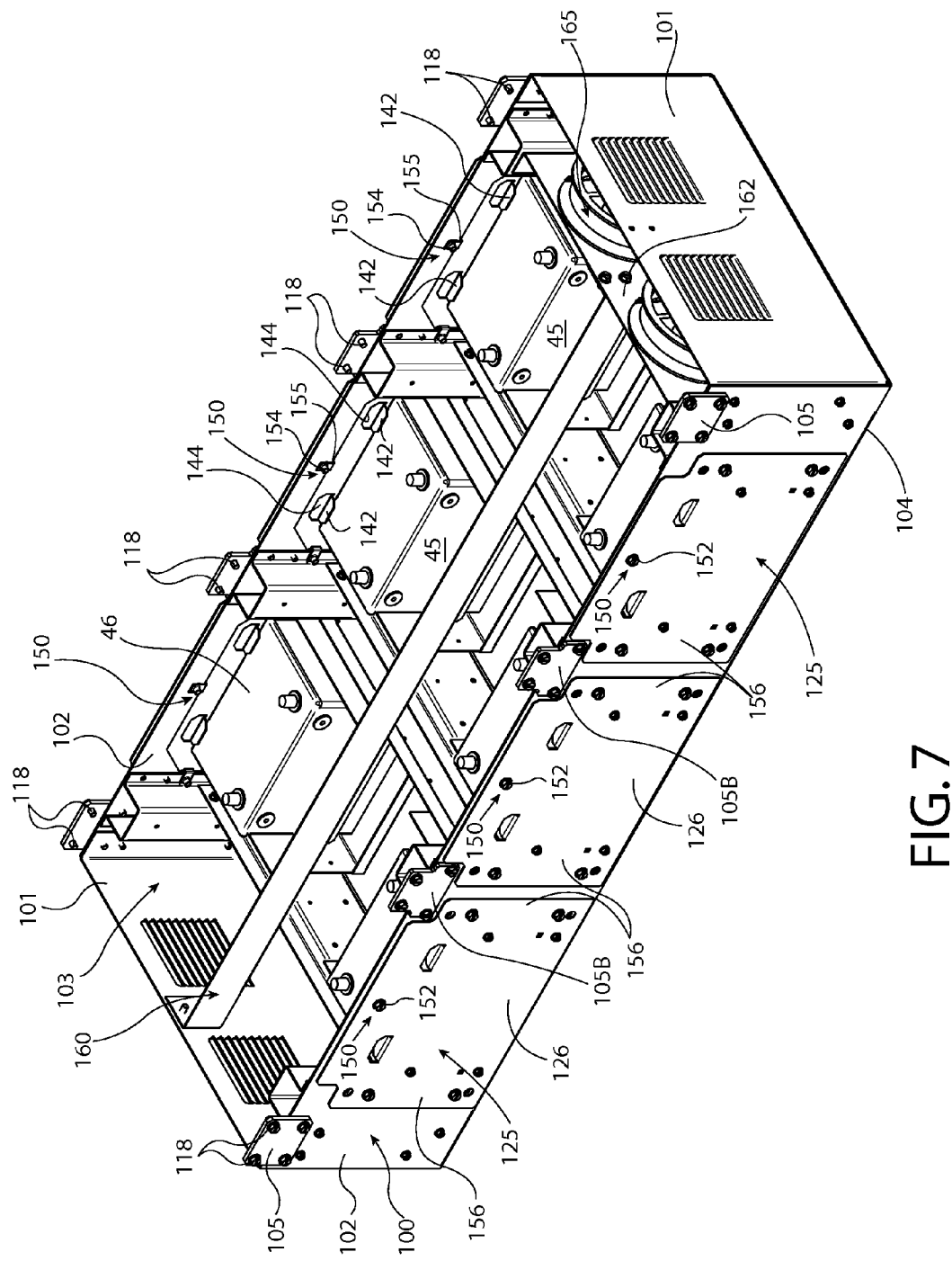
FIG. 7 is a perspective view of the energy storage compartment depicted in FIG. 4 with the drawer assembly in a closed position.

With reference to FIGS. 6 and 7, drawer 125 may further include one or more handles 140 to facilitate opening and closing of drawers 125. Handle 140 may have any shape or configuration that facilitates opening or closing of drawer in the example shown, handle 140 is formed in faceplate 126 by stamping a pair of horizontally spaced tabs 142 inward from the faceplate to form openings 144 that the user may grasp. As best shown in FIG. 7, the height of openings 144 may correspond to the height of battery 45 so that the inwardly extending tabs 142 overlie a portion of the battery 45 and help secure it within cabinet 100. It will be appreciated that tabs 142 need not be formed as part of the handles assembly and may be separately provided to perform the securing function apart from a handle being provided for the drawer 125. To that end, tabs 142 may be any inwardly extending projection adapted to engage an upper surface 46 of one or more energy storage devices. Tab 142 may be formed as part as of the drawer 125, as shown, or provided on another structure within or forming part of cabinet 100.

In accordance with another aspect of the invention, when closed drawer 125 may be held in the closed position by a lock assembly, generally indicated by the number 150. Lock assembly 150 may be any structure that secures the A drawer 125 in a closed position. Lock assembly 150 may secure a single drawer, as shown, or multiple drawers. Lock assembly 150 may include but is not limited to, a hold down bar, latch, clip, fastener and the like that prevents inadvertent outward movement of the drawer 125. Lock assembly 150 is releasable to allow opening of drawer 125 as needed. In the example shown, lock assembly 150 includes a fastener 152 that extends through faceplate 126 and is threadably received within a receiver 154 supported on or formed in cabinet 100. In the example shown, cabinet 100 defines an opening through which the fastener 152 is received. A clip 155 having a thread engaging surface may be applied to cabinet 100 to fit over the opening an engage the threads of fasteners 152. In the example shown, lock assembly includes at least one fastener 152 located in the portion of faceplate 126 that over laps a portion of cabinet 100. For example, at an upper portion of faceplate 126 that over laps the top portion of a side wall 102 of cabinet 100, a single fastener may be located centrally on faceplate to extend through sidewall 102. Additional fasteners may be located at lateral extremities 156 of drawers 125 to further secure the drawers 125.

As discussed above, batteries 45 are electrically connected to controller 30 or optionally directly to torch 50. The depicted example is not limiting as other energy storage devices may be used or other types of batteries may be used that require different connections. In the example shown, a power cable or lead L attaches to the positive terminal of battery 45, as by a battery connector or clamp. A ground cable G is attached to the negative terminal of battery 45, as be a battery connector or clamp; and is attached to the cabinet 100. A central support 160 extends the length of cabinet 100 and is located between the batteries 45 on either side of cabinet 100. Central support 160 may be attached to end walls 101 or other part of cabinet 100. The cabinet 100 shown includes an intermediate panel 16L that defines a compartment for fans 165. Central support extends between end wall 101 and this panel 162 and is attached there to by fasteners. Ground cable G may attach to central support 160 to ground the batteries 45 to cabinet 100.

What is claimed is:

1. A hybrid welder comprising:
   a controller:
   an engine, the engine being electrically connected to the controller to provide electrical power thereto;
   a housing supporting the engine;
   an energy storage device adapted to provide alternative or supplemental electrical power to the controller;
   a cabinet supporting the energy storage device, wherein the cabinet is attached to the housing by a releasable attachment assembly, and wherein the releasable attachment assembly is used to selectively detach the cabinet from the housing;
   a power connector including a conductor electrically connected to the controller and the energy storage device, wherein the conductor includes at least one post associated with the energy storage device and wherein at least one of the energy storage device and the controller are electrically connected to the conductor by a connector that is selectively detachable from the post to disconnect the energy storage device from the controller when the cabinet is detached from the housing; and
   a sensor lead connected to the energy storage device and the controller, the sensor lead placing the controller in sensing communication with the energy storage device, wherein the controller is adapted to monitor performance of the energy storage device through the sensor lead and regulate the power generated by the engine and the energy storage device, wherein the sensor lead is connected to the controller by a modular connector that is detachable when the cabinet is detached from the housing to break the connection between the sensor lead and the controller; wherein the conductor includes a bus bar housed within the cabinet, the bus bar being in electrical communication with the energy storage device, and wherein the power connector includes a power cable connected to the controller and selectively attachable to the bus bar at the post; and wherein the power cable is detachable from the post to disconnect the energy storage device from the controller, and wherein the energy storage device includes a plurality of batteries, wherein each of the plurality of batteries is electrically connected to the bus bar to supply electrical power to the controller by attachment of the power cable to the post.

2. The hybrid welder of claim 1, wherein the plurality of batteries are housed within the cabinet and wherein the cabinet includes a plurality of access panels corresponding to each of the plurality of batteries, each access panel being removable from the cabinet to expose the corresponding one of the plurality of batteries.

3. The hybrid welder of claim 2, wherein each of the plurality of batteries is mounted within a corresponding one of a plurality of drawers and wherein each of the plurality of access panels forms a faceplate of the corresponding drawer, wherein each battery of the plurality of batteries is independently accessible externally of the cabinet by pulling the corresponding drawer outward of the cabinet.

4. The hybrid welder of claim 3, wherein each of the plurality of drawers is mounted on a slider assembly including an extendable rail supported within the cabinet and extendable externally of the cabinet when the drawer is pulled outward.

5. The hybrid welder of claim 3, wherein each of the plurality of drawers includes a lock assembly adapted to secure the drawer to the cabinet in a closed position.

6. The hybrid welder of claim 5, wherein the lock assembly includes a bolt driven through the corresponding faceplate into a portion of the welder to lock the corresponding faceplate to the welder.

7. The hybrid welder of claim 1 wherein the controller selectively operates the engine to provide power while the energy storage device is disconnected.

8. The hybrid welder of claim 1 wherein the controller is in electrical communication with the energy storage device via the sensor lead, the controller being adapted to monitor the performance of the electronic storage device and wherein the controller is adapted to communicate at least one of a visual cue, an audible cue, and a tactile cue as to the performance of the energy storage device.

9. The hybrid welder of claim 8, wherein the controller includes a display adapted to visually display a performance value detected by the controller.

10. A hybrid welder comprising:
    a controller;
    an engine, the engine being electrically connected to the controller to provide electrical power thereto;
    a housing supporting the engine;
    an energy storage device including a plurality of batteries adapted to provide power to the controller;
    a cabinet supporting the energy storage device, wherein the cabinet is attached to the housing by a releasable attachment assembly, and wherein the releasable attachment assembly is used to selectively detach the cabinet from the housing, the cabinet including a plurality of drawers each adapted to provide selective access to a corresponding one or more of the plurality of batteries;
    a power connector including a conductor electrically connected to the controller and the energy storage device, wherein the conductor includes at least one post associated with the energy storage device and wherein at least one of the energy storage device and the controller are electrically connected to the conductor by a connector that is selectively detachable from the post to disconnect the energy storage device from the controller when the cabinet is detached from the housing; and
    a sensor lead connected to the energy storage device and the controller, the sensor lead placing the controller in sensing communication with the energy storage device, wherein the controller is adapted to monitor performance of the energy storage device through the sensor lead and regulate the power generated by the engine and the energy storage device, wherein the sensor lead is connected to the controller by a sensor connection that is detachable when the cabinet is detached from the housing to break the connection between the sensor lead and the controller; and a torch connected to the controller, the torch receiving electrical power from the controller to perform at least one of a welding operation, a cutting operation, and a heating operation wherein the controller is connected to the post by a power cable that is detachable from the post to disconnect the energy storage device from the controller; and wherein each of the plurality of batteries is electrically connected to the bus bar to supply electrical power to the controller by attachment of the power cable to the post.

* * * * *